United States Patent [19]
Akiyama

[11] 3,734,299
[45] May 22, 1973

[54] AUTOMATIC CONTINUOUSLY BACKFLOW WASHING-TYPE FILTER

[75] Inventor: Jiro Akiyama, Yokohama, Japan

[73] Assignee: Kanagawa Kiki Kogyo Co., Ltd., Yokohama-shi, Japan

[22] Filed: Dec. 20, 1971

[21] Appl. No.: 209,557

[30] Foreign Application Priority Data

Dec. 28, 1970  Japan..............................45/132035

[52] U.S. Cl...................................210/333, 210/336
[51] Int. Cl. ..............................................B01d 29/38
[58] Field of Search..............................210/333, 336

[56] References Cited

UNITED STATES PATENTS 3,545,621  12/1970  Lamurt............................210/336 X Primary Examiner—Frank A. Spear, Jr.
Attorney—E. F. Wenderoth et al.

[57] ABSTRACT

An automatic continuously backflow washing-type filter comprising a primary filtering unit, a substantial area portion of which is employed to primarily filter a charge of oil to be filtered, a filtrate accumulation chamber for accumulating and supplying a substantial portion of the filtrate from said primary filtering unit to a consuming device and recycling the remaining minor portion of the filtrate as a backflow washing oil which automatically washes the primary filtering unit incrementally, and a secondary filtering unit for filtering said backflow washing oil after the washing of the primary filtering unit and containing foreign matter therein which was separated from the original charge of oil, the secondary filtering unit being also incrementally and automatically washed while filtering the backflow washing oil from the washing operation through the primary filtering unit.

1 Claim, 9 Drawing Figures

JIRO AKIYAMA, INVENTOR

JIRO AKIYAMA,
INVENTOR

JIRO AKIYAMA,
INVENTOR

Patented May 22, 1973

JIRO AKIYAMA,
INVENTOR

BY Wenderoth, Lind & Ponack
ATTORNEYs

AUTOMATIC CONTINUOUSLY BACKFLOW WASHING-TYPE FILTER

This invention relates to an automatic continuously backflow washing-type filter and more particularly, to an automatic continuously filtering-type filter which comprises a primary filtering unit and a secondary filtering unit which can be automatically and continuously backflow washed.

In all of the prior art automatic backflow washing-type filters, the entrained foreign materials filtered out of the oil deposit on the filtering wire screen, so the resistance offered by the screen to the filtering increases gradually from the outset of the filtering operation. Generally, such a type filter utilizes the so-called intermittent flow-reversing system in which, when the filtering resistance reaches a predetermined value or a timer set value, the flow direction of the oil is reversed. In the prior art intermittent flow direction reversing system, if the timing of the reversing of the flow direction is not right, the backflow washing is not carried out satisfactorily and the wire screen clogs and the filter downtime necessary for backflow-washing of the wire screen increases gradually. In addition, an increasing amount of backflow washing oil is consumed and the amount of filtrate to be supplied to a consuming device is decreased accordingly; in extreme cases it is impossible to perform the backflow washing operation.

In order to eliminate the disadvantages inherent in the prior art backflow washing-type filter referred to above, an improved continuous backflow washing-type system in which the filtering wire screen in incrementally backflow-washed has been developed. However, such backflow washing-type filter has presented a specific problem in the disposal of the backflow washing oil containing the foreign matter which had been deposited on the wire screen when the original contaminated oil was filtered through the screen wire. If the oil used as the backflow washing medium is returned to a supply tank as it is, there is a build-up of deposited foreign matter in the tank resulting in decreased effectiveness of the backflow washing. There has been also proposed another type of backflow washing-type filter in which the oil used as the backflow washing medium is first returned to and stored in the tank and then introduced into a centrifugal separator to be purified therein and the purified oil is again returned to the tank. However, such an arrangement requires substantial floor space and is rather uneconomical.

In order to eliminate the disadvantages inherent in the prior art filters in the automatic continuously backflow washing-type filter of the invention, an oil charge to be filtered is pumped from a tank into the filter where the oil is first filtered through a substantial portion of a primary filtering unit and a substantial portion of the filtrate is delivered to a consumption device of facility and the remaining small portion of the filtrate containing foreign matter separated from the original oil through the primary filtering unit is passed through a substantial portion of a secondary filtering unit to be filtered thereby and thereafter recycled to the suction side of the pump or the tank. A portion of the filtrate received in a filtrate accumulation chamber which is positioned adjacent the primary filtering unit is caused to flow back through the primary filtering unit to backwash the unit and carries foreign matter therein which was separated from the primary filtering unit. The oil now laden with foreign matter is then caused to pass through the secondary filtering unit to be filtered by the secondary filtering unit whereby the foreign matter carried therein is separated from the backflow oil to deposit within a sludge accumulation area from which the deposited foreign matter is eventually discharged out of the filter into a sludge tank as a drain valve is intermittently opened.

One object of the present invention is to provide an improved automatic continuously backflow washing-type filter.

Another object of the present invention is to provide an automatic filter in which a primary filtering unit and a secondary filtering unit can be smoothly and positively backflow washed.

A still further object of the present invention is to provide an automatic continuously backflow washing-type filter which is economical in operation and which eliminates the necessity for any specific separate backflow washing device.

According to the present invention, there has been provided an automatic continuously backflow washing-type filter comprising a vertical cylindrical housing having the peripheral wall provided with an upper flange, a lower flange positioned below and spaced from said upper flange, an oil inlet and a contaminated oil accumulation chamber in communication with said inlet positioned above said upper flange, a filtrate delivery outlet positioned between said upper and lower flanges on the other side, a filtrate recycling opening provided at the bottom of the housing on said first side and a foreign matter discharge opening on said other side; a vertical cock cylinder disposed coaxially within said housing having the lower portion fitted on said recycling opening and including a peripheral wall portion extending between said upper and lower flanges provided with a first slit group comprising a plurality of equally spaced radial slits, a first recessed section positioned below said first slit group and having a plurality of equally spaced radial openings, a second peripheral wall portion extending between said lower flange and the bottom of the housing provided with a second recessed wall section having a plurality of equally spaced openings and a second slit group comprising a plurality of equally spaced radial slits, and slits of the second slit group being offset one half pitch with respect to the corresponding slits of the first slit group and said peripheral wall portions of the cock cylinder being provided with a plurality of equally spaced radial ribs the number of which corresponds to that of the slits of the first and second slit groups, respectively thereby to define a plurality of isolated chambers for each slit group; a primary filtering unit surrounding said first slit group to define a filtrate accumulation chamber therewith, a secondary filtering unit surrounding said second slit group to define a backflow washing oil accumulation chamber therewith; a backflow washing cock rotatably received coaxially within said cock cylinder to define a filtrate passage and a backflow washing oil passage in cooperation with the cock cylinder; and a drive source for said cock; said cock further including a communication area for communicating between said contaminated oil accumulation chamber in the housing and one of said first group slits except for a primary filtering unit backwashing passage which communicates between one of the first group slits and said backflow washing oil passage and a secondary filtering unit backwashing passage adapted to successively communicate between one of said second group slits and said filtrate passage; and said cock cylinder and cock defining a communication area for connecting between said first slit group and recycling opening.

The above and other objects and attendant advantages of the present invention will be more readily apparent to those skilled in the art from a reading of the following detailed description of the invention in conjunction with the accompanying drawings which show a preferred embodiment of the invention for illustration purpose only, but not for limiting the scope of the same in anyway.

Figure 1:
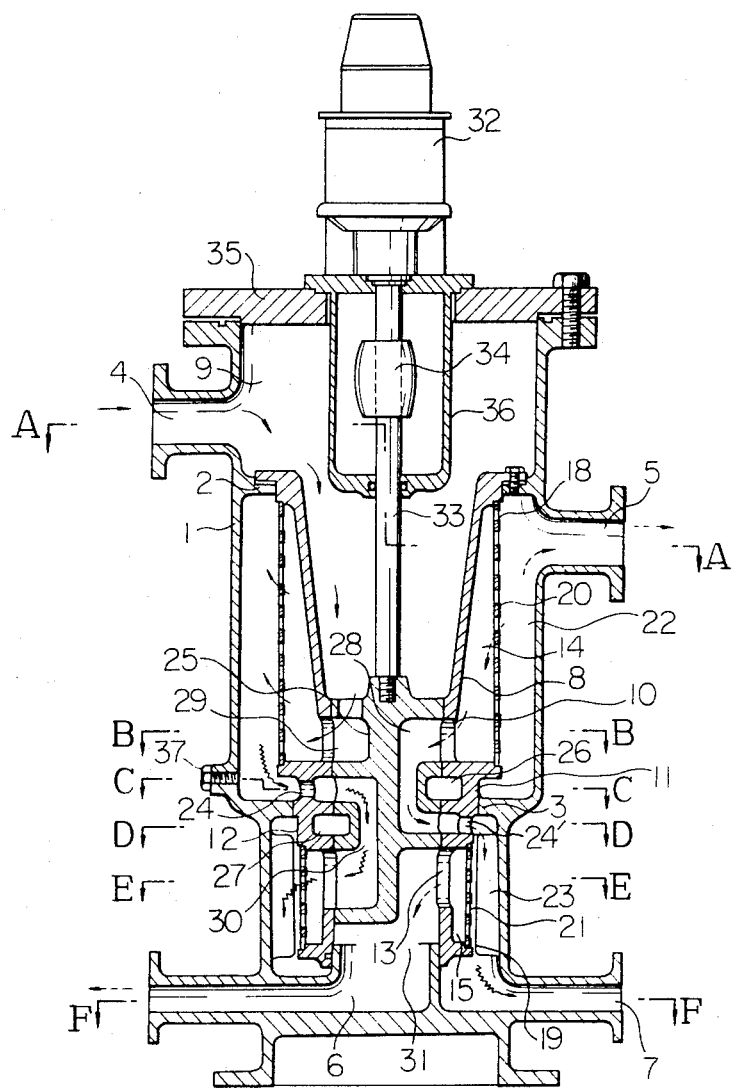
FIG. 1 is a vertically sectional view of one form of automatic continuously backflow washing-type filter according to the present invention.
Figure 2:
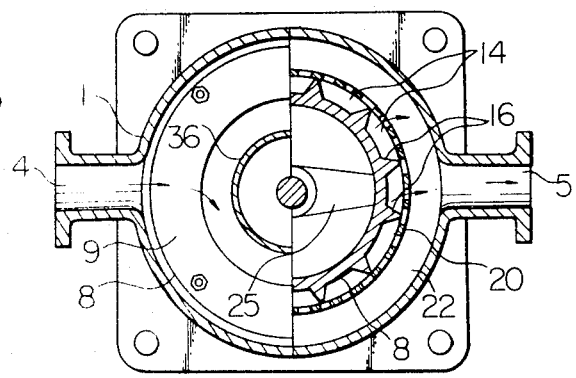
FIG. 2 is a cross-sectional view taken substantially along the line A — A of FIG. 1.
Figure 3:
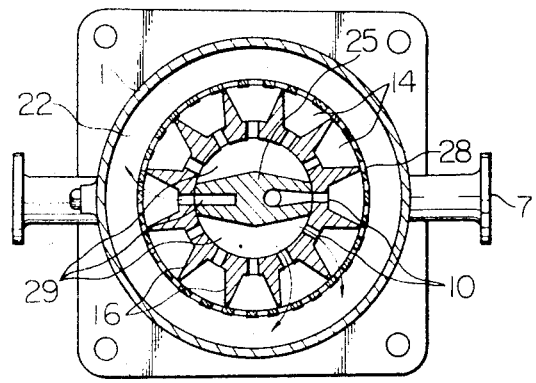
FIG. 3 is a cross-sectional view taken substantially along the line B — B of FIG. 1.
Figure 4:
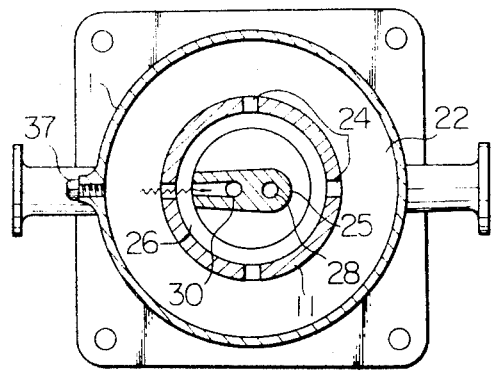
FIG. 4 is a cross-sectional view taken substantially along the line C — C of FIG. 1.
Figure 5:
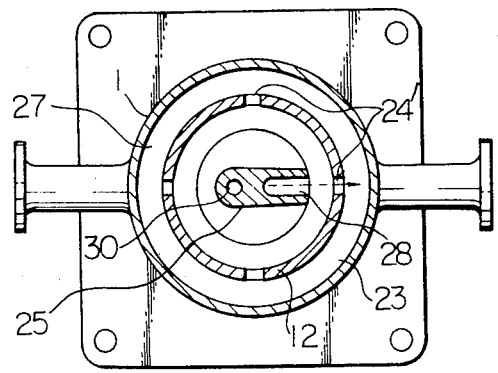
FIG. 5 is a cross-sectional view taken substantially along the line D — D of FIG. 1.
Figure 6:
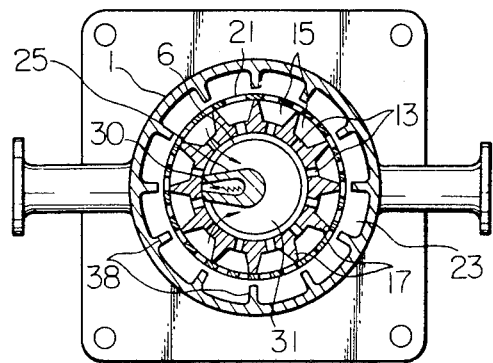
FIG. 6 is a cross-sectional view taken substantially along the line E — E of FIG. 1.
Figure 7:
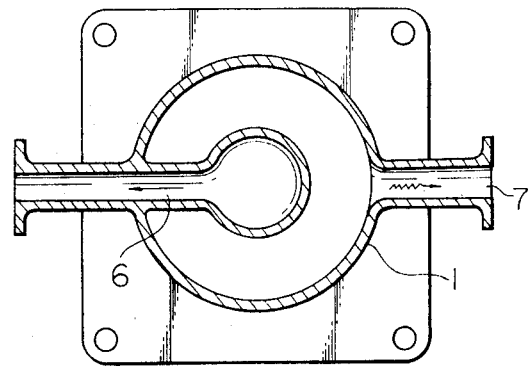
FIG. 7 is a cross-sectional view taken substantially along the line F — F of FIG. 1.
Figure 8:
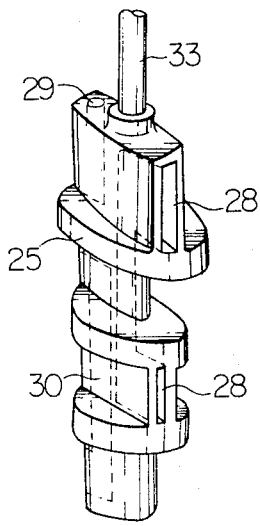
FIG. 8 is a fragmentary perspective view of a backflow washing cock employed in said filter.
Figure 9:
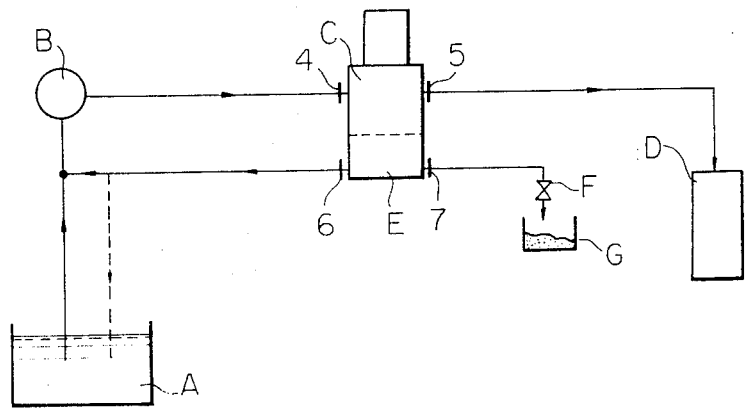
FIG. 9 is a schematic view of a piping system employed in said filter.

The present invention will be now described referring to the accompanying drawings and more particularly to FIGS. 1 to 7 inclusive thereof. The filter of the invention generally comprises a vertical cylindrical housing 1 which has a peripheral wall provided with a radially and inwardly extending annular upper flange 2 at a point adjacent to and below the upper end and a radially and inwardly extending lower flange 3 at a point below the upper flange and above the lower end of the housing 1. As shown in FIG. 1, the housing further has on one side of the peripheral wall (the left hand side as seen in FIG. 1) an oil inlet 4 at a point above the upper flange 2 and an oil outlet 5 on the other side of the peripheral wall ( the right hand side as seen in FIG. 1) between the upper and lower flanges 2 and 3. The oil inlet 4 is in communication with a material oil supply source such as a tank A through a pump B (FIG. 9) and the oil outlet 5 is in communication with a consuming device or facility to deliver the filtrate from the filter to the consuming device. The bottom of the housing 1 has on one side (the left hand side as seen in FIG. 1) an opening 6 which is in communication at the outer end with the tank A which is adapted to receive and store a portion of a filtrate the major portion of which is discharged through the outlet 5 out of the filter to be consumed by the consuming device or facility. The inner end of the opening 6 is in communication with the interior of the housing 1. The bottom of the housing 1 also has on the other side (the right hand side as seen in FIG. 1) a foreign matter discharge opening 7.

A cock cylinder 8 is coaxially and fixedly disposed within the housing 1 and has the upper end secured to the upper flange 2 by suitable securing means such as bolts. The lower end of the cock cylinder 8 is fitted on the inner end of the opening 6 with the interior of the cylinder in communication with the interior of the housing 1. A portion of the housing 1 above the upper flange 2 defines an annular contaminated oil accumulation chamber 9 in cooperation with the upper end portion of the cock cylinder 8. The peripheral wall portion of the cock cylinder 8 extending between the upper and lower flanges 2 and 3 of the housing 1 is provided with a first slit group 10 comprising twelve equally spaced radial slits and an inwardly opening annular recessed wall section 11 positioned right below the first slit group 10 for defining a filtrate passage in cooperation with a mating section of a member which will be described hereinafter. The peripheral wall portion of the cock cylinder 8 extending between the lower flange 3 and bottom of the housing 1 right below the recessed wall section 11 is provided with a second inwardly opening annular recessed wall section 12 for defining a backflow washing oil passage in cooperation with another mating section of the member which will be described hereinafter and a second slit group 13 comprising 12 equally spaced radial slits positioned below the second recessed wall section 12. The slits of the second slit group 13 and the slits of the first slit group 11 are alternately disposed about the axis of the cock cylinder 8 with each slit of the second group slits centrically positioned between two adjacent ones of the first slit group. The peripheral wall section of the cock cylinder 8 where the first slit group 10 is provided further with twelve equally spaced radially and outwardly extending ribs 16 with each rib positioned between adjacent slits thereby to define twelve independent chambers 14 by adjacent ribs. Each of the chambers is in communication with each of the slits 10. A porous filtering medium supporting member 20 such as a wire screen is provided extending between and secured to the upper and lower flanges 2 and 3 of the housing 1 in a surrounding relationship to the portion of the cock cylinder 8 extending between the upper and lower flanges, and a filtering medium 18 such as a filter paper or the like is applied along the inner surface of the supporting member to provide a primary filtering unit. Similarly, the peripheral wall portion of the cock cylinder 8 extending between the lower flange 3 and bottom of the housing where the second slit group 13 is provided further has twelve equally spaced radially and outwardly extending ribs 17 with each rib positioned between adjacent slits thereby to define 12 independent chambers 15 by adjacent ribs. Each of the chambers 15 is in communication with each of the slits 13. A second filtering medium supporting member 19 such as a wire screen is provided extending between the second recessed wall section 12 and the bottom of the cock cylinder 8 in a surrounding relationship to the second slit group 13 and a second filtering medium 21 such as a filtering paper or the like is applied along the outer surface of the second supporting member to provide a secondary filtering unit.

The filtering area and capacity of the primary and secondary filtering units may be varied depending upon the type of contaminated oil to be treated and the amount of foreign matter contained in the oil to be removed from the oil by the filter of the invention. It is desirable that the filtering area of the secondary filtering unit be set one fourth that of the primary filtering unit, but both the filtering units have the same filtering capacity.

An annular filtrate accumulation chamber 22 is defined by the housing peripheral wall portion between the upper and lower flanges 2 and 3, the primary filtering unit 18, 20 and the recessed wall section 11 of the cock cylinder 8. An annular backflow washing oil accumulation chamber 23 is defined by the peripheral wall portion extending between the lower flange 3 and bottom of the housing 1 and the secondary filtering unit 19, 21. Four equally spaced radial openings 24 are provided in the first recessed wall section 11 of the cock cylinder 8 and similarly, four equally spaced radial openings 24' are also provided in the second recessed wall section 12 of the cock cylinder.

A backflow washing cock 25 adapted to distribute the backflow washing oil is rotatably disposed within the cock cylinder 8 in a coaxial relationship to the latter and has vertically extending substantially U-shaped primary and secondary backflow washing oil passages 28 and 30 on the opposite sides with respect to the axis of the cock. The passage 28 is adapted to successively communicate at one leg with one of the first slit group slits 10 during the rotation of the cock whereas the other leg of the passage 28 is adapted to successively communicate with one of the openings 24' in the cock cylinder during the rotation of the cock. The passage 30 is adapted to successively communicate at one leg with one of the second slit group slits 13 during the rotation of the cock whereas the other leg of the passage is also adapted to successively communicate with one of the openings 24. The size of the openings in the legs of these passages 28 and 30 is so selected that they can freely communicate with the associated slits and openings, respectively.

An area in the periphery of the cock 25 adjacent to one leg of the U-shaped passage 28 defines a communication area 29 in communication with all the first slit group slits 10 except one selected slit and including a passage diametrically opposite the particular leg of the passage 28 and the space defined by the opposing cock and cock cylinder portions adjacent the passage leg. Another area in the periphery of the cock 25 adjacent one leg of the passage 30 defines a filtrate passage 26 in cooperation with the recessed wall section 11 of the cock cylinder 8. Similarly, another area in the periphery of the cock 25 adjacent to the other leg of the passage 28 defines a space or backflow washing oil passage 27 in cooperation with the recessed wall section 12 in the housing 1. Lastly, another area in the periphery of the cock 25 adjacent to the other leg of the passage 30 defines a space or communication area 31 in cooperation with the periphery of the cock cylinder 8 at the lower end of the latter. Thus, the communication area 31 is adapted to simultaneously communicate with all or all those of the second slit group 13 except one selected slit.

The open top of the housing 1 is normally closed by a cover 35 secured to the top by means of suitable securing means such as bolts and a drive source 32 such as a geared electric motor or oil pressure actuator is mounted on the cover 35. The drive source 32 has a drive shaft which is drivingly connected to the rotary drive shaft 33 of the cock 25 by means of a coupling 34 housed in an oil seal casing 36 which depends from the cover 35 into the housing 1 whereby the cock 25 is rotated within the cock cylinder 8 by the motor 32 as the motor is energized. A drain plug 37 is provided in the peripheral wall of the housing 1 at a point adjacent and above the lower flange 3. The portion of the housing 1 where the backflow washing oil accumulation chamber 23 is provided has a plurality of radially and inwardly extending sludge dispersion preventing partitions 38 in opposition to the ribs 17 in the cock cylinder 8, respectively.

In operation, an oil to be filtered is first pumped into the oil accumulation chamber 9 via the inlet 4 of the housing 1 and passes through the cock cylinder 8 to the communication area 29. Having passed through the cock cylinder 8 and communication area 29, the oil then passes through all or the rest of the slits of the first slit group 10 except one selected slit into the isolated chambers 14 from where the oil passes through the primary filtering unit 18, 20 to be filtrated thereby. A major portion of the filtrate enters into the filtrate accumulation chamber 22 and then discharges out of the filter via the outlet 5 to be delivered to the consuming device or facility whereas the foreign matter is separated from the filtrate and blocked by the filtering medium 18 from entering into the filtrate accumulation chamber associated with the primary filtering unit to allow deposit on the filtering medium 18.

On the other hand, the cock 25 is continuously rotated by the drive source 32. During the rotation of the cock 25, when the primary filtering unit backwashing passage 28 communicates with one selected slit of the first slit group 10, the pressure within the passage 28 becomes substantially the same as the atmospheric pressure. Therefore, a portion of the filtrate received and accumulated within the filtrate accumulation chamber 23 is forced to pass back through the primary filtering unit 18, 20 surrounding the isolated chambers 14 in communication with the first slit group 10 into the primary filtering unit washing oil passage 28 to remove the foreign matter deposited on the filtering medium 18 of the primary filtering unit. As mentioned above, since the filtrate accumulation passage 28 successively communicates with one selected slit of the first slit group at one time during the rotation of the cock 25, the primary filtering unit 18, 20 is backwashed at an area equivalent to one twelfth of the whole area thereof each time whereas the rest area or the area equivalent to eleven-twelfths of the whole area can continuously perform the normal filtering operation whereby a sufficient amount of filtrate can be continuously delivered to the consuming device.

The backflow washing oil which constitutes a small portion of the filtrate then passes through the primary filtering unit backwashing oil passage 28, backwashing oil passage 27 and openings 24' while maintaining its original oil pressure. From the openings 24', the backwashing oil enters into the backflow washing oil accumulation chamber 23 and passes through the secondary filtering unit 19, 21 under the same pressure as at the time of its passage through the primary filtering unit 18, 20 to be filtered by the secondary filtering unit whereby the foreign matter which was entrained therein when the backflow oil backwashed by the primary filtering unit is removed from the oil and at the same time the secondary filtering unit is backwashed by the oil. Having passed through the secondary filtering unit 19, 21 and been filtered, the secondary filtrate passes through the backflow opening 6 to the suction side of the pump B or into the tank A. As in the case of the primary filtering operation, the foreign matters separated from the secondary filtrate as the latter was passing through the secondary filtering unit 19, 21 are allowed to deposit on the filtering medium 21 of the secondary filtering unit 19, 21. The foreign matter deposited on the secondary filtering medium 21 is removed from the medium in the same manner as the foreign matter deposited on the primary filtering medium 18 is removed from the medium as the primary filtering unit is backwashed by the rotation of the cock 25; that is, when the secondary filtering unit backwashing oil passage 30 communicates with one selected slit of the second slit group 13, that portion of the filtrate accumulated within the filtrate accumulation chamber 22 passes through the openings 24 and passage 26 into the secondary filtering unit backwashing oil passage 30 from where the filtrate portion passes inwardly through the secondary filtering unit 19, 21 positioned in the outer boundary of the independent chambers 15 associated with the second slit group 13 into the backflow washing oil accumulation chamber 23. In this way, during the rotation of the cock 25, the secondary filtering unit 19, 21 is automatically backwashed at an area equivalent to one-twelfth of the whole area each time whereas the remaining eleven-twelfths of the whole area can continuously perform the normal filtering operation. Thus, the oil received in the backflow washing oil passage 23 contains foreign matter from both the primary and secondary filtering operations. The foreign matter in the oil received in the backflow washing oil chamber 23 is prevented from dispersing by the partitions 33 during the secondary filtering operation and allowed to accumulate at the bottom of the chamber 23 and foreign matter discharge opening 7. The accumulating foreign matter can be optionally and intermittently discharged out of the filter through the discharge opening 7 into a sludge tank G which is in communication with the opening 7 by opening the drain valve F as necessary.

As is clear from the foregoing, according to the present invention, an oil charge is first filtrated through the primary filtering unit 18, 20 and a substantial portion of the filtrate is supplied to the consuming device or facility whereas the remaining small portion of the filtrate is further recycled in the filter to be utilized to backwash the primary filter as the cock 25 rotates and therefore, the primary filtering unit is continuously and incrementally backwashed whereby the filtering unit is always maintained clean and positive filtering operation is assured. Since the primary filtering unit is continuously and incrementally backwashed foreign matter is prevented from depositing on the filtering unit in a thick layer and accordingly, only a small amount of the backflow washing oil flow is necessary to backwash the filtering unit. And since the oil portion recycled to be returned to the tank A after the same has passed through the primary and secondary filtering steps is substantially free of foreign matter, there is no possibility of the foreign matter being deposited within the tank. The secondary filtering units 19, 21 is also continuously and incrementally backwashed at a pressure at the discharge port of the pump minus the resistance by the primary filtering unit with the filtrate as the backflow washing oil from the filtrate accumulation chamber 22 in the same manner as the primary filtering unit. Since the backflow washing oil portion is filtered by the secondary filtering unit to be recycled, the amount of oil which is discharged through the sludge discharge opening 7 is a quite small so the amount of oil wasted is limited to a small value thereby ensuring economical utilization of the oil. Since the angular position of the slits of the second slit group 13 are offset that of from the slits of the first slit group 10 by one half pitch with respect to the axis of the cock cylinder 8, the timing of the backwashing operation on the primary filtering unit and that on the secondary filtering unit do not coincide with each other so that the two different filtering units can be smoothly and positively backwashed independently. Since both the primary and secondary filtering units are housed in the common single housing 1, there is no necessity to provide separate backwash oil disposal means for the primary and secondary filtering units, respectively thereby making it possible to minimize the floor space for such oil disposal means and reduce expense as compared with the arrangement in which separate oil disposal means are provided for the primary and secondary filtering units.

Although the number of the slits in each slit group has been given as twelve in the foregoing, the specific number of the slits are only illustrative for description purpose only and therefore, the number of such slits in each group can be varied as desired or necessary within the scope of the invention.

There has been described above what is at present considered to be the preferred embodiment of this invention, but it will be obvious to those skilled in the art that various changes and modifications may be made therein without departing from the invention, and it is aimed, therefore, in the appended claim to cover all such changes and modifications as fall within the true spirit and scope of the invention.

What we claim is:

1. An automatic continuously backflow washing-type filter comprising a vertically cylindrical housing having the peripheral wall provided with an upper flange, a lower flange positioned below and spaced from said upper flange, an oil inlet and a contaminated oil accumulation chamber in communication with said inlet positioned above said upper flange on one side, a filtrate delivery outlet positioned between said upper and lower flanges on the other side, a filtrate recycling opening provided at the bottom of the housing on said one side and a foreign matter discharge opening on said other side; a vertical cock cylinder disposed coaxially within said housing having the lower portion fitted on said recycling opening and including a peripheral wall portion extending between said upper and lower flanges provided with a first slit group comprising a plurality of equally spaced radial slits, a first recessed section positioned below said first slit group and having a plurality of equally spaced radial openings, a second peripheral wall portion extending between said lower flange and the bottom of the housing provided with a second recessed wall section having a plurality of equally spaced openings and a second slit group comprising a plurality of equally spaced radial slits, said slits of the second slit group being offset one half pitch with respect to the corresponding slits of the first slit group and said peripheral wall portions of the cock cylinder being provided with a plurality of equally spaced radial ribs the number of which corresponds to that of the slits of the first and second slit groups, respectively thereby to define a plurality of isolated chambers for each slit group; a primary filtering unit surrounding said first slit group to define a filtrate accumulation chamber therewith, a secondary filtering unit surrounding said second slit group to define a backflow washing oil accumulation chamber therewith; a backflow washing cock rotatably received coaxially within said cock cylinder to define a filtrate passage and a backflow washing oil passage in cooperation with the cock cylinder; and a drive source for said cock, said cock further including a communication area for communicating between said contaminated oil accumulation chamber in the housing and one of said first slit group slits except for a primary filtering unit backwashing passage which communicates between one of the first group slits and said backflow washing oil passage and a secondary filtering unit backwashing passage adapted to successively communicate between one of said second group slits and said filtrate passage; and said cock cylinder and cock defining a communication area for connecting between said first slit group and recycling opening.

* * * * *